A. E. OSTRANDER.
CAR CONSTRUCTION.
APPLICATION FILED MAY 18, 1912.
1,066,647.
Patented July 8, 1913.
7 SHEETS—SHEET 4.
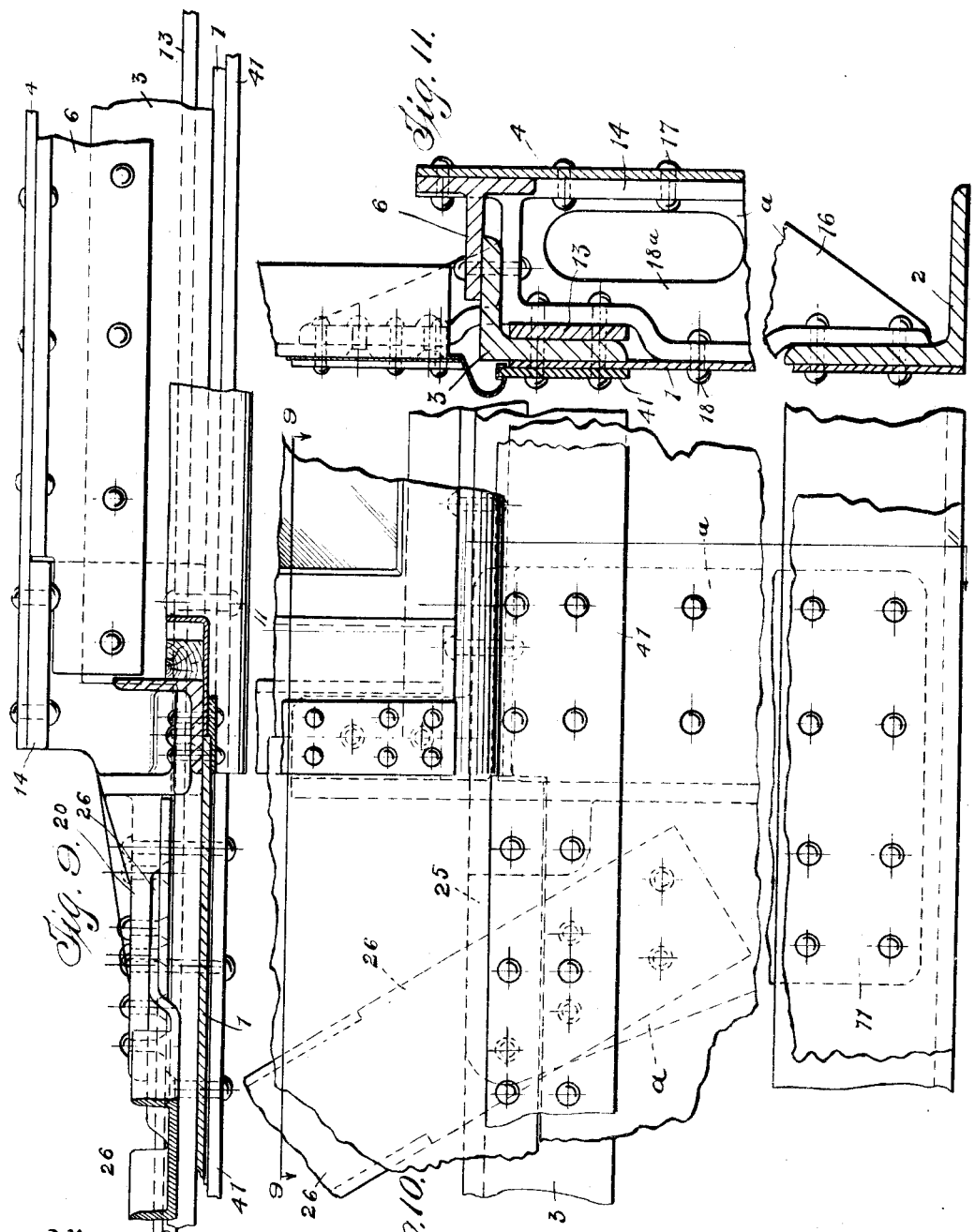

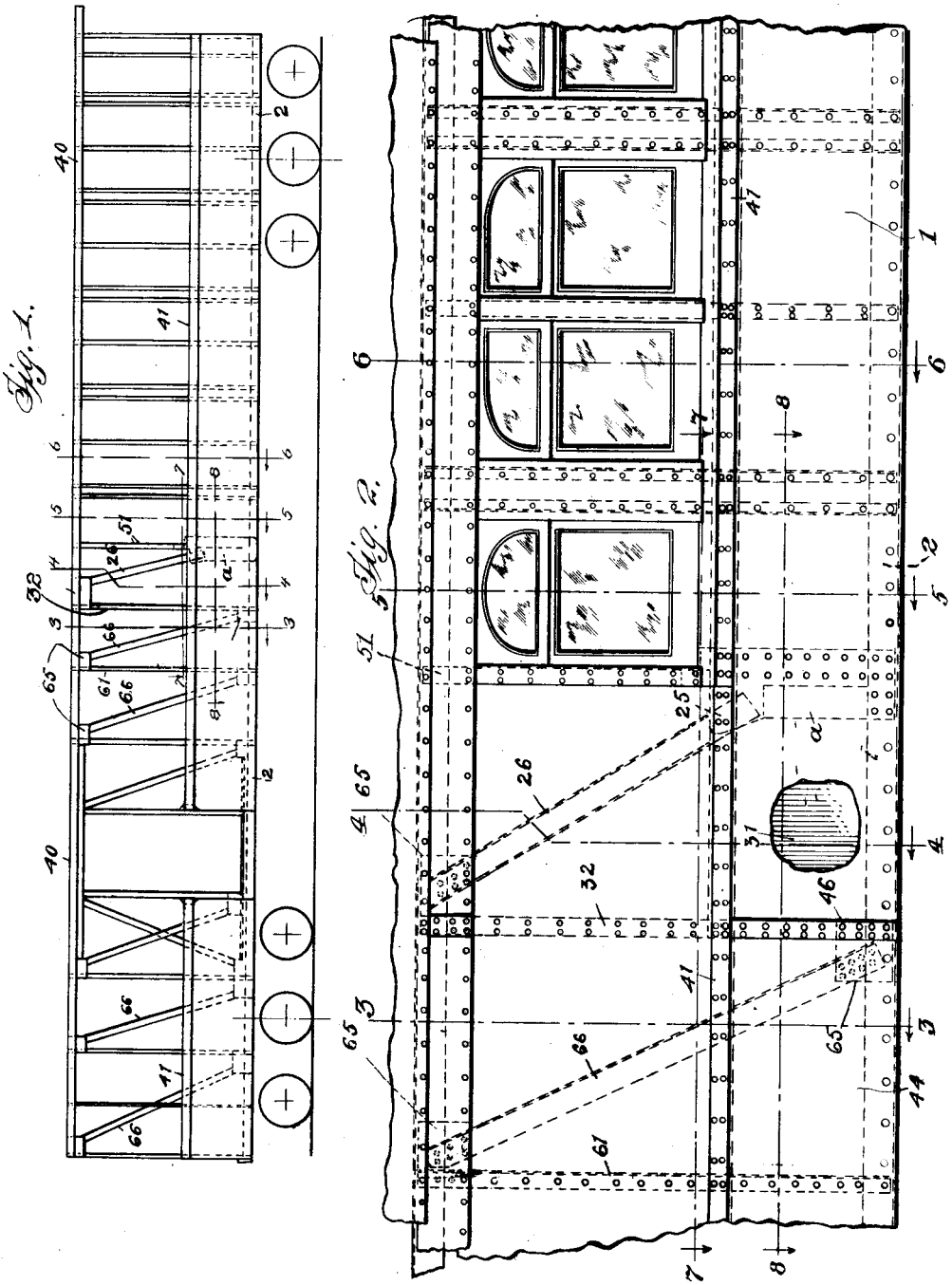

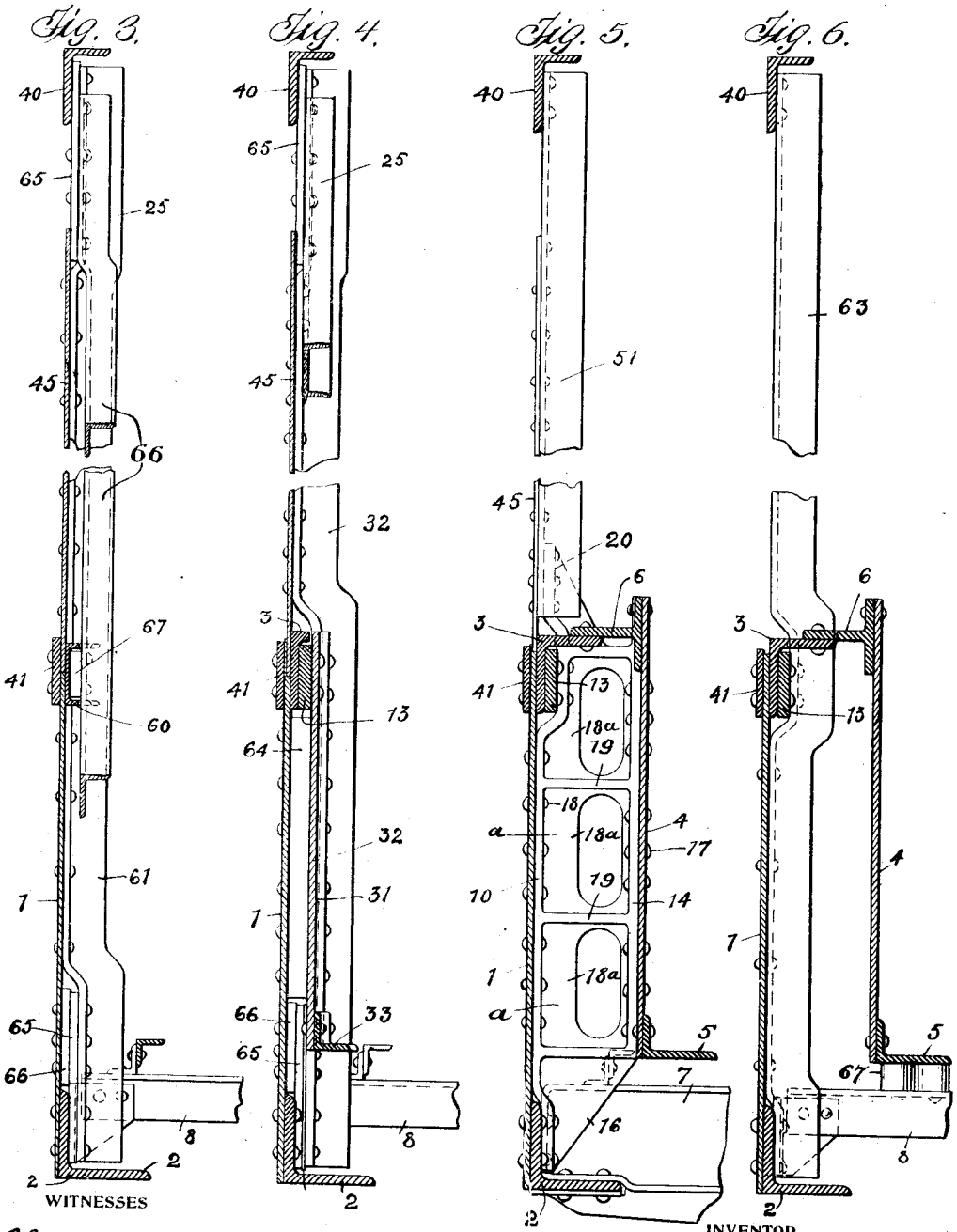

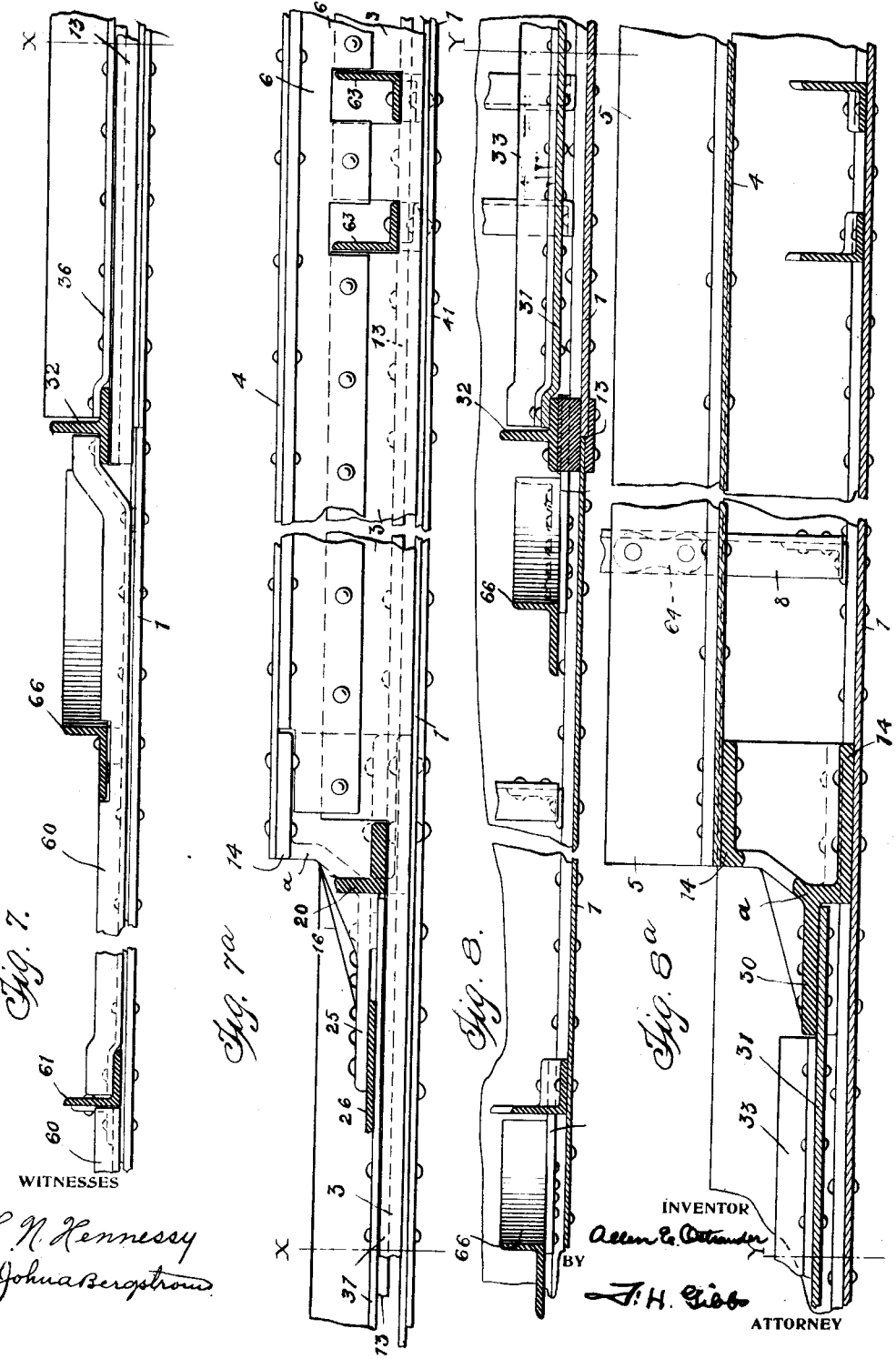

A. E. OSTRANDER.
CAR CONSTRUCTION.
APPLICATION FILED MAY 18, 1912.

1,066,647.

Patented July 8, 1913.
7 SHEETS—SHEET 5.

WITNESSES

INVENTOR
BY
ATTORNEY

A. E. OSTRANDER.
CAR CONSTRUCTION.
APPLICATION FILED MAY 18, 1912.
1,066,647.
Patented July 8, 1913.
7 SHEETS—SHEET 6.
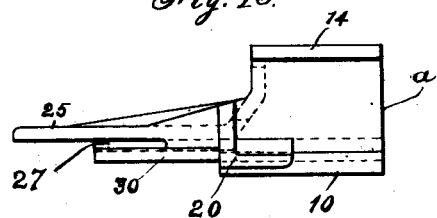
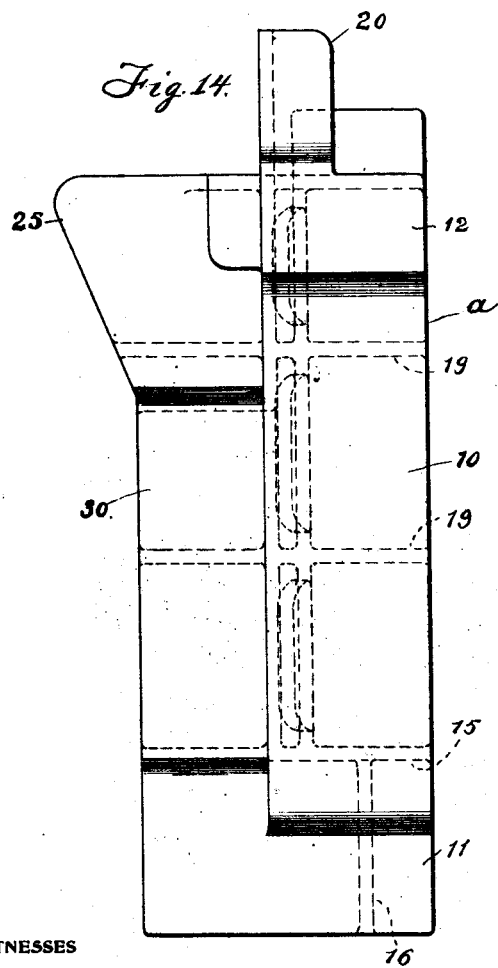
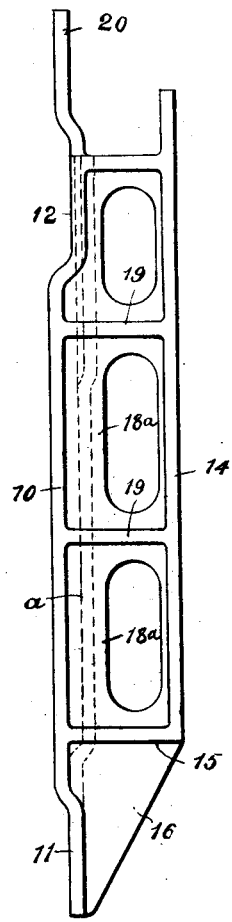
WITNESSES
INVENTOR
ATTORNEY A. E. OSTRANDER.
CAR CONSTRUCTION.
APPLICATION FILED MAY 18, 1912.
1,066,647.
Patented July 8, 1913.
7 SHEETS—SHEET 7.
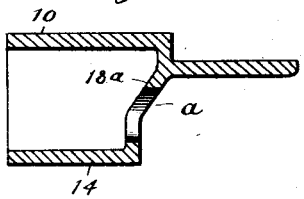
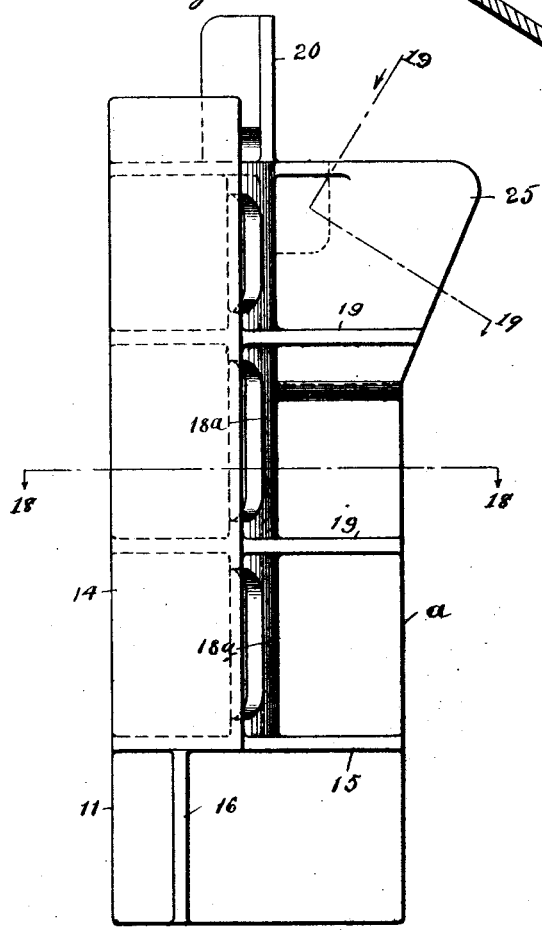
WITNESSES
INVENTOR
ATTORNEY

UNITED STATES PATENT OFFICE.

ALLEN E. OSTRANDER, OF RIDGEWOOD, NEW JERSEY, ASSIGNOR TO AMERICAN CAR AND FOUNDRY COMPANY, OF ST. LOUIS, MISSOURI, A CORPORATION OF NEW JERSEY.

CAR CONSTRUCTION.

1,066,645.         Specification of Letters Patent.         Patented July 8, 1913.

Application filed May 18, 1912. Serial No. 698,325.

*To all whom it may concern:*

Be it known that I, ALLEN E. OSTRANDER, residing at Ridgewood, Bergen county, New Jersey, and being a citizen of the United States, have invented certain new and useful Improvements in Car Construction, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

Figure 12:
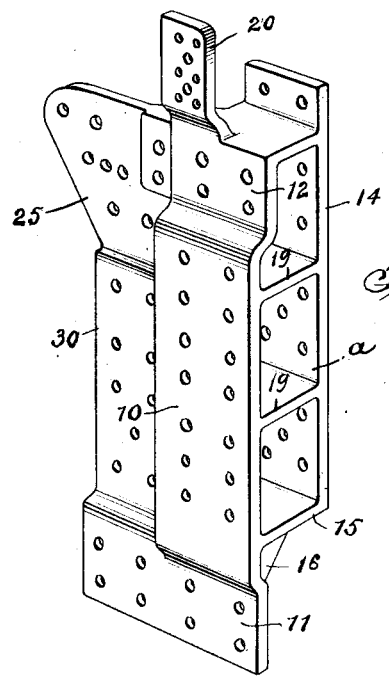
Figure 13:
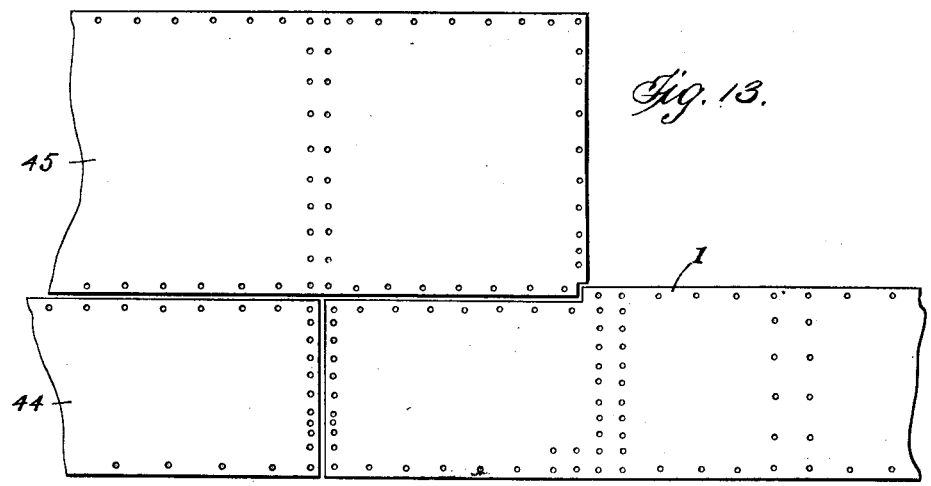

In said drawings: Figure 1 is a diagrammatic view of a car constructed in accordance with this invention, illustrating the general scheme of bracing, the upper sheathing plates being omitted. Fig. 2 is an enlarged view of a portion of the side of the car illustrating that portion of the car wall embodying the change from a plate girder to a trussed girder. Figs. 3, 4, 5 and 6 are enlarged transverse sectional views through the car wall, said sections being taken respectively on the planes of lines 3—3, 4—4, 5—5, and 6—6 of Fig. 1 or on the same sectional lines in Fig. 2, the window frame construction being omitted. Figs. 7 and 7ª comprise a horizontal sectional view, Fig. 7ª being an extension of Fig. 7, said section being taken substantially on the plane of line 7—7 of Fig. 1 or on the same sectional lines in Fig. 2. Figs. 8 and 8ª comprise a horizontal sectional view; Fig. 8ª being an extension of Fig. 8, said section being taken substantially on the plane of line 8—8 of Fig. 1 or on the same sectional lines in Fig. 2. Fig. 9 is a section of the line 9—9 of Fig. 10. Fig. 10 is a fragmental view showing in dotted lines the method of attaching the top and bottom sheathing plates to the casting. Fig. 11 is a section of Fig. 10 on the line 11—11. Fig. 12 is a perspective view of a casting adapted to be placed at the juncture of the plate girder construction and the trussed girder construction for involving one into the other. Fig. 13 is a view illustrating the method of changing the plates of the plate girder construction into the plates of the trussed girder construction. Fig. 14 is a front view of the casting illustrated in perspective in Fig. 12. Fig. 15 is an end view of the plate girder side of said casting. Fig. 16 is a top or plan view of the casting. Fig. 17 is a rear view of the casting. Fig. 18 is a section of Fig. 17 on the line 18—18 looking in the direction of the arrow. Fig. 19 is a fragmentary section of Fig. 17 on the line 19—19 looking in the direction of the arrow.

One object of this invention is to simplify the construction of the walls of combination cars, and the invention particularly relates to combined passenger and baggage cars, or passenger and mail cars, and comprehends a junctural construction so formed that the usual compound construction of the plate girder of a passenger car end of the car may involve into a simple truss construction of the baggage car end of such car without material change in either construction, and at the same time strengthening the joints between such constructions.

Another object of the invention is to so arrange the connections between the plate girder portion and the truss portion of the walls of such cars as to permit ready access to the associated parts to permit of suitable rivet connection of the several elements and to make the zone of junction equally strong or stronger than the girder and truss thus connected.

In detail, the invention contemplates a junctural member, preferably a casting, so shaped as to conform to the inner and outer plate girder construction of a passenger car, and arranged to rigidly secure the terminals thereof and carry the superstructure conforming to such constructions. It is also so shaped as to form a terminal brace and reinforcement for the trussed frame construction of the baggage car portion of the car body and is designed to save floor space in the baggage compartment.

Referring to the parts, it will be noted that the side wall of the car comprises for a portion of its length a double plate girder construction, which is made up of an inner and an outer girder, extending from one end of the car at the right of the drawing shown in Fig. 1 to a line beyond the left hand window shown in Fig. 2, this plate girder comprising an inner and an outer plate girder portion suitably connected at the top by overlapping angular members riveted together, as best shown in Fig. 6. No claim is made in this application to the plate girder construction *per se*, as that plate girder construction forms the subject-matter of an application, Serial No. 475,928, filed February 3, 1909, which resulted in Patent No. 1,045,429, dated Nov. 26, 1912, but this application is directed to means for combining the plate girder of that application with a trussed girder which is more especially adaptable to combination cars, as above set forth.

Referring further to the parts, 1 is a shallow outside sheathing plate of sufficiently thick metal to serve as the web of a girder; 2 is a bottom angle member connected with said web; 3 is a top angle member connected with said web, which top angle member is connected by a vertical flange with the web 1, and has its horizontal flange extending inwardly toward the body portion of the car; 4 is an inner plate which, when combined with the bottom angle member 5 and the top T section 6, forms an inner plate girder, and it is to be noted that the horizontal web of the member 6 overlaps and is riveted to the horizontal flange of the member 3, as best shown in Figs. 5 and 6. Connected with the outer plate girder thus formed, and extending transversely of the car, are cross-bearers 7 of sufficient number, and intermediate the cross-bearers and extending to the same upper plane, are a series of floor supports 8, which latter are connected with the vertical posts, hereinafter referred to, forming parts of the superstructure or housing comprising the body of the passenger carrying portion of the car. Beyond the double plate girder thus referred to and extending to the opposite end of the car, the side wall formation is in the general form of a truss girder, which is combined and connected with the double plate girder in the manner and form hereinafter described. As the connection of the truss and the double plate girder is dependent upon their association with the connection casting illustrated herein, special reference is directed to Figs. 12 and 14 to 19, inclusive. The object of this casting is to provide strong, durable and easily applied connecting means for the plate girders and the truss, so formed and arranged as to afford convenient access thereto in assembling the car parts, so as to permit riveting to said casting the plate girder and truss, as hereinafter described.

Referring to the casting, 10 is the outer wall thereof, which is vertical for the major portion of its height and is recessed inwardly at the bottom at 11, sufficiently to permit the vertical leg of the angle 2 to rest in said recess and permit the web 1 of the outer girder to be secured to the outer face of said flange and to the face 10 of the casting and present a smooth vertical surface. Likewise, an upper portion of said casting at 12 is recessed, but to a greater degree, to permit the vertical flange of the angle 3 to rest in said recess and to permit the reinforcing strap or filler 13 also to rest in said recess between the vertical flange of the angle 3 and the face 12 of the recess, as shown in Fig. 5 of the drawing. The inner face 14 of the casting presents a perpendicular plane surface, against which rests the web of the inner plate girder 4, which web is riveted to said face 14, as shown in said Fig. 5, the angle 5 of said inner girder terminating in approximate alinement with the horizontal bottom face 15 of the casting, while strengthening ribs 16 are provided to reinforce the bottom portion of the casting.

The walls 10 and 14 of the casting are separated a sufficient distance to permit convenient access to the rivets 17 and 18, uniting the inner and outer plate girders to said casting, and the walls are connected and strengthened by intermediate vertical fillets 18ᵃ and horizontal webs 19.

Extending upwardly and in alinement with the face 10 of the casting, above the angle 3, is an extension 20, which is provided for convenient attachment to one of the vertical body posts of the car, as shown in Fig. 5, while projecting laterally from the main body portion of the casting and toward the left, as shown in Figs. 2 and 10, is a flange 25 extending obliquely outwardly to serve as a means for attachment of a diagonal member 26 of the truss portion of the car wall, which member 26 is in the form of a channel with its flanges projecting inwardly toward the body of the car, which flanges are cut away, as indicated in Fig. 10, to permit the web portion of said channel to enter the slot or channel 27 of the casting *a*.

Below the flange 25, as best shown in Figs. 8 and 8ᵃ, the casting is provided with lateral extensions 30 which serve as anchor supports for the inner end of the short plate girder 31 which extends from the said lateral extensions 30 forwardly to the body posts 32 to which posts the said short plate girder is connected, the web of said girder being connected with the filler 13, as before referred to, and being provided with a bottom angle 33, as shown in Figs. 4 and 8.

It is to be observed that the angle 2 extends the entire length of the car body, and likewise there is provided a continuous side plate 40, which extends the entire length of the car body; and the vertical posts throughout the length of the car wall, both vertical and oblique, are connected with said bottom angle 2 and with the angular side plate 40, either directly, as shown in Figs. 3 to 6, inclusive, or by means of gusset plates, as shown at the left end portion of Fig. 1, so that the bottom angle 2, the side plate 40 and the body posts and diagonals of the wall are brought into coöperative relation. Likewise, extending the entire length of the car wall exclusive of the door opening, there is provided a belt rail or belt plate 41, best shown in Fig. 2, which is directly riveted to and serves as a reinforcing member for the shallow outside plate girder along the passenger carrying portion of the car, and likewise serves as a cover for the meeting edges of the sheathing plates 44, and the sheathing plates 45, the sheathing plates 44 being continuations of the sheathing plate 1 but of less thickness, the sheathing plates 44 and 45 are connected with the posts and diagonals of the truss girder portion of the wall, Fig. 13 showing the said plates and likewise showing an exaggerated gap between the said plates, which is covered by the member 41 referred to.

There is provided a splice plate 46, which extends from the bottom of the plates 1 and 44 to the member 41 at the juncture of the plates 1 and 44, being riveted directly to said plates and to the body post 51, as shown in Fig. 2, this plate being omitted from Fig. 4, because of the number of parts illustrated in the figure, and to avoid confusion of lines.

It is to be observed that in vertical alinement with the casting $a$ is a short post 51, which extends from said casting to the side plate 40, and that the casting $a$ likewise serve as the lower terminus of the diagonal brace 26, before referred to, which diagonal brace is connected not only with the casting but also with the outer plate girder web and with the reinforcing member 41, as best shown in Figs. 2, 9 and 10.

It will be noted that the angle 3 and the T section 6 are cut away for the passage of the vertical body posts of the car, as in said earlier application, this being true throughout the plate girder portion of the side wall; whereas, in the truss girder portion the body posts are not recessed at the belt rail and short channel sections 60 interposed between the body posts, the flanges of which channels, where necessary, are cut away to permit passage of the diagonal posts of the truss construction. The horizontal flange of the angle 3 is of uniform width throughout the length of the double plate girder portion to the casting $a$, before referred to; but from the casting forwardly to the post 32, said top flange is reduced in width to accommodate the less widely spaced double plate girder portion.

Referring particularly to the body posts, it is to be observed that the post 61 and the other posts between it and the left-hand end of the car, are substantially vertical throughout the major portion of their length, being offset only at the top and bottom to project inwardly so as to be secured to the inner face of the side plate 40 and to gussets 65 connecting them with the lower angle 2. The post 32 of Fig. 4 is substantially the same as the post 61 at its upper portion, but extends inwardly to lap the belt rail filler 13 and the vertical filler 64 interposed between the two sheets of the narrow plate girder, said post extending thence vertically downwardly, and being likewise connected with the gusset plate secured to the inner face of said bottom angle.

The post 51, as before indicated, is a short post section which extends from the side plate 40 downwardly and is connected with the upward extension 20 of said casting $a$, while the vertical posts, as 63, throughout the wider double plate girder portion are vertical for the major portion of their length, being offset only at the belt rail and at the bottom for the bottom angle 2. Throughout the length of the car at the cross-bearers and floor supports, there are placed fillers 67 resting upon said cross-bearers and floor supports, to which fillers the angles 5 of the inner plate girder are connected to stiffen the structure.

Where the vertical posts and diagonals are connected with the side plate 40 and the angle 2 in the truss portion of the framing, suitable gusset plates, as 65, are provided, and to compensate for the offset thus provided at the angle 2, fillers 66 are interposed, as shown in Figs. 3 and 4.

It is to be noted that beyond the post 32 the belt rail members 3 and 13 are omitted, and channels 60, before referred to, serve as stiffeners for the outer belt rail 41, the diagonals or oblique members 66 being connected with the webs of said channel through interposed fillers 67, as shown in Fig. 3, a portion of the flanges of the channels being cut away to permit passage of said diagonal members, which diagonal members are connected at top and bottom with the gusset plates before referred to.

What I claim is:

1. In a car wall construction, the combination of a plate girder construction and a truss girder construction of different depths longitudinally extended and connecting means for involving one construction into the other.

2. In a car wall construction, the combination of a plate-girder construction and a truss-girder construction longitudinally extended and a filler between parts of said plate-girder with which said truss-girder is connected.

3. In a car wall construction, the combination of a plate-girder construction and a truss-girder construction longitudinally extended and an offset filler adapted to serve as a connector for parts of said plate-girder, the truss-girder being connected with an offset of the filler.

4. In a car wall construction, the combination of a plate-girder construction and a truss girder construction longitudinally extended and an offset filler adapted to serve as a connector for differently spaced portions of said plate-girder.

5. In a car wall construction, the combination of a plate-girder construction and a truss-girder construction longitudinally extended, a portion of the truss-girder overlapping part of the plate-girder, a connector for plate-girder parts and a diagonal of the truss-girder lapping and being secured to said connector.

6. In a car wall construction, the combination of a plate-girder construction and a truss-girder construction longitudinally extended and a connecting casting within said plate-girder, said casting comprising spaced vertical walls adapted for connection with spaced plate-girders.

7. In a car wall construction, the combination of a plate-girder construction and a truss-girder construction longitudinally extended and a connecting casting within said plate-girder, said casting comprising spaced vertical walls adapted for connection with spaced plate-girders and an offset portion adapted to serve as an additional wall support.

8. In a car wall construction, the combination of a plate-girder construction and a truss-girder construction longitudinally extended, and a connecting member within said plate girder comprising spaced vertical walls, means for connecting said walls and means for connection with said truss-girder.

9. In a car wall a combination comprising differently spaced parallel plate-girders and means for connecting said girders.

10. In car construction, a combination wall of compound plate-girder construction and truss-girder construction and connecting means for involving the one construction into the other.

11. In car construction, a combination wall comprising plate-girder construction for part of its length and truss-girder construction for part of its length, and connecting means attached to the plate-girder construction on one side of the line of juncture and attached to the truss-girder construction.

12. In car construction, a combination wall comprising connected plate-girder construction, for part of its length, and truss-girder construction for part of its length, and unitary connecting means conforming to the interior contour of the plate-girder construction on one side of the line juncture.

13. In car construction, a combination wall comprising plate-girder construction and truss-girder construction, and a connecting casting uniting said girders.

14. In car construction, a combination wall comprising plate-girder construction and truss-girder construction, a connecting casting recessed to receive a tension member of one of said constructions.

15. In car construction, a combination wall comprising a plate-girder construction and truss-girder construction, a connecting casting attached to both constructions within their zone of juncture and connected with a side post of the plate-girder construction and an angular side brace of the truss-girder construction.

16. In car construction, a combination wall comprising plate-girder construction and truss-girder construction, a connecting casting, the outer plate-girder comprising an outer plate extending beyond the casting to a post of the truss-girder construction and secured thereto, a supplemental plate-girder extending from the casting to the said post within the car body and secured to said post.

17. In car construction, a combination wall comprising plate-girder construction and truss-girder construction, a connecting casting recessed to receive a compression member and the compression member diminishing in width within the plate-girder.

18. In car construction, a combination wall comprising a plate-girder construction including a compression member and a truss-girder construction, connecting means therefor recessed to receive the compression member of the plate-girder, said compression member diminishing in width within the plate-girder construction and a reinforcing plate extending parallel with the truss-girder construction and lapping said plate-girder.

19. In car construction, a combination wall comprising a connected plate-girder construction and truss-girder construction, connecting means intermediate a part of the constructions and connected with inner and outer plate-girders and provided with an extension recess for a diagonal brace of the truss girder construction.

20. In car construction, a combination wall comprising a plate-girder construction and a truss-girder construction, a series of side posts recessed throughout the plate-girder construction to receive a compression member but not recessed throughout the truss-girder construction beyond where the said compression member ends.

21. In car construction, a connecting casting comprising an inner wall for attachment to an inner plate-girder of a plate-girder construction, an outer wall for attachment to an outer plate-girder, a web connecting the walls and an extension web for attachment to a truss-girder construction.

22. In car construction, a connecting casting comprising an inner wall for attachment to an inner plate girder, and an outer wall recessed to receive members of the plate-girder and truss-girder constructions.

23. In car construction, a connecting casting comprising an inner plate-girder carrying wall, an outer plate-girder carrying wall, a web connecting the same, and an extension adapted for connection with a truss-girder.

24. In car construction, a connecting casting comprising an inner plate-girder carrying wall, an outer plate-girder carrying wall, connecting and reinforcing webs therefor, and recesses in the outer plate-girder carrying wall for flanged members of the plate-girder construction.

25. In car construction, a connecting casting comprising an inner plate-girder carrying wall, an outer plate-girder carrying wall, connecting and reinforcing webs therefor, said casting having recesses in the outer plate-girder carrying wall for members of a plate-girder construction and an offset for a member of a truss-girder construction.

26. In car construction, a connecting casting comprising an inner plate-girder carrying wall, an outer plate-girder carrying wall, connecting and reinforcing webs therefor, said casting having recesses in the outer plate-girder carrying wall for members of a plate-girder construction and having a recess for a member of a truss-girder construction and a reinforcing web between the walls.

27. In car construction, a connecting casting provided with webs for reinforcing the tension and compression members of a plate-girder construction and a member of a truss-girder construction.

28. In car construction, a double plate-girder construction and a truss-girder construction connected therewith, a connecting casting for said constructions and a short supplemental plate girder construction attached to said casting and to the truss girder construction.

29. In car construction, a double plate-girder construction, a truss-girder construction comprising upper and lower body plates, a connecting means for the said plates and an interposed casting connecting the plate girder and truss girder constructions.

In witness whereof I have hereunto set my hand in the presence of two witnesses.

ALLEN E. OSTRANDER.

Witnesses:
FREDERICK H. GIBBS,
R. H. DAVENPORT.